W. H. Long,
Revolving Rake.
No. 99,331.  Patented Feb. 1, 1870.
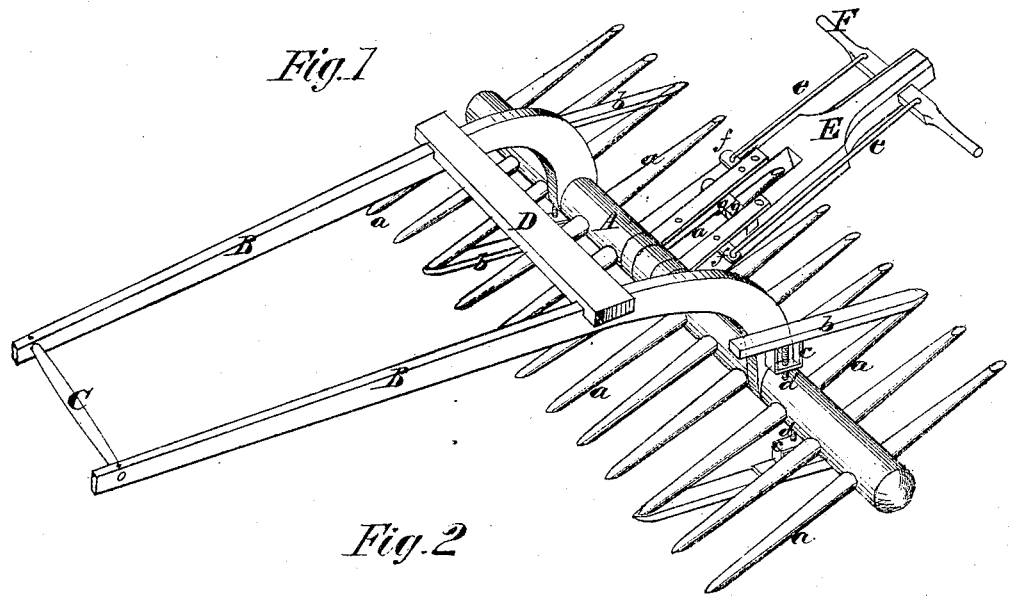
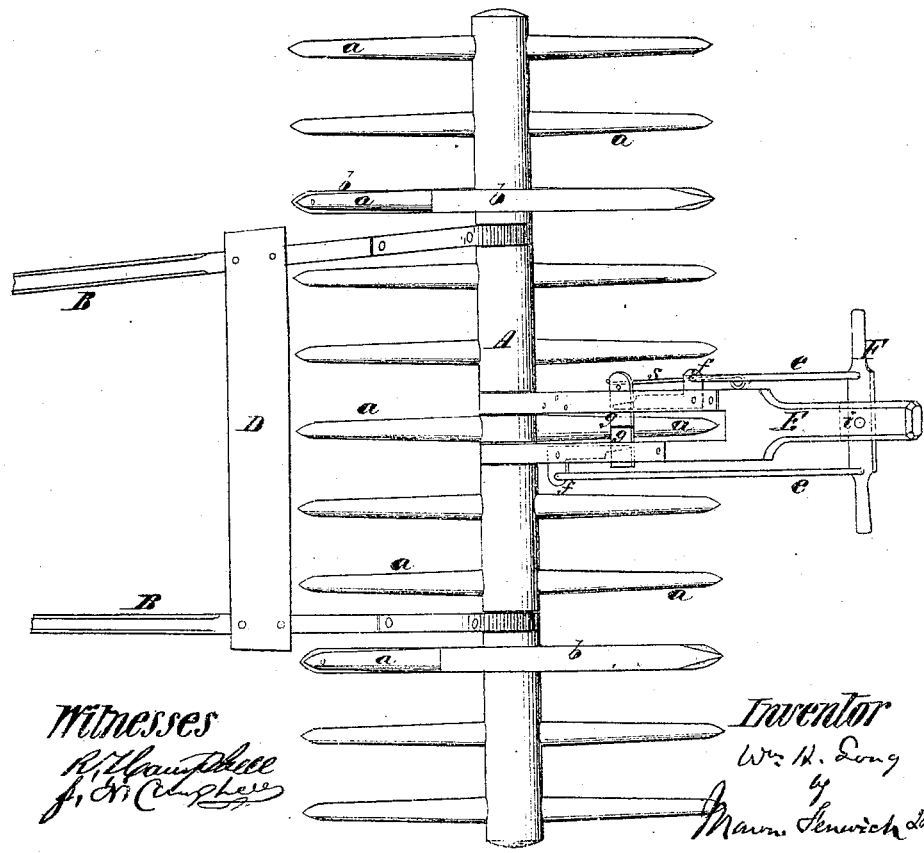
Witnesses  Inventor
  Wm. H. Long W. H. Long,
Revolving Rake.

No. 99,331.    Patented Feb. 1, 1870.

2 Sheets, Sheet 2.

Witnesses.    Inventor

United States Patent Office.

WILLIAM H. LONG, OF EDDYVILLE, IOWA.

Letters Patent No. 99,331, dated February 1, 1870.

IMPROVEMENT IN HORSE HAY-RAKES.

The Schedule referred to in these Letters Patent and making part of the same.

To all whom it may concern:

Be it known that I, WILLIAM H. LONG, of Eddyville, in the county of Wapello, and State of Iowa, have invented a new and Improved Hay-Rake; and I do hereby declare that the following is a full, clear, and exact description thereof, reference being had to the accompanying drawings, making part of this specification, in which—

Figure 1, plate 1, is a perspective view of my improved rake, complete.

Figure 2, plate 1, is a top view of the rake, with the front portions of the thills and their cross-bar broken away.

Figure 3:
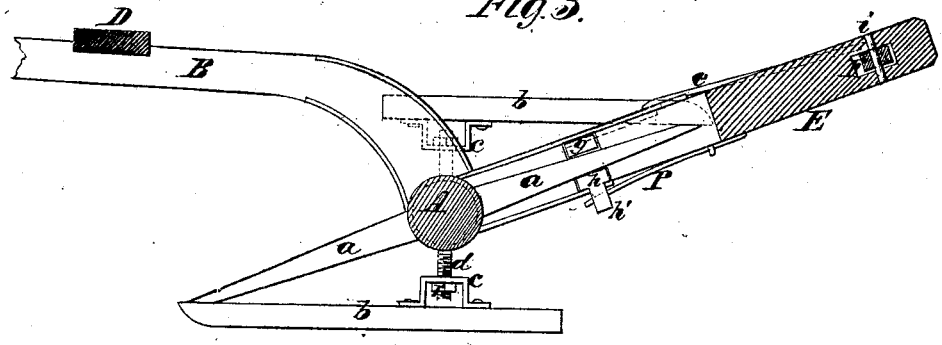

Figure 3, plate 2, is a section, taken in a vertical plane through the rake-head and handle.

Figure 4:
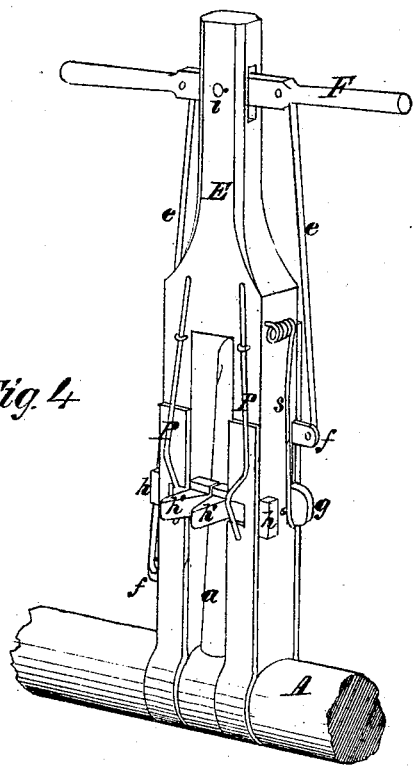

Figure 4, plate 2, is a perspective view, exposing to view the bottom side of the rake-handle, and the parts applied thereto.

Figure 5:
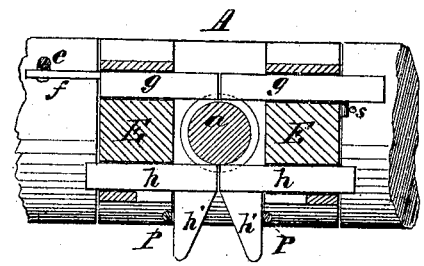

Figure 5 is a section in detail, showing the spring-jaws, which are applied above and below the central rake-tooth, for holding the tines in raking position.

Similar letters of reference indicate corresponding parts in the several figures.

This invention relates to certain novel improvements on that class of rotary hay-rakes which are dragged along upon the ground, and at proper times are allowed to turn over and discharge their gathered loads, by releasing one of their tines from catches, which are applied to a handle that is held by an attendant.

The nature of my invention consists—

First, in combining with runners, which are applied to revolving rake-teeth, adjusting-devices, which will admit of the tines being set, to work at different inclinations, as will be hereinafter explained.

Second, is a self-catching device, in combination with a releasing-device, applied to the handle of a rake, and adapted for holding the tines in raking-position by one of its tines, and allowing the tines to be released and turned, for discharging a gathered load, as will be hereinafter explained.

Third, in combining with a pivoted cross-bar, which is applied to the handle of the rake, for operating the releasing-device, a spring, or its equivalent, which will keep said cross-bar and its releasing-device in proper position for arresting the rake without attention on the part of the operator, and also prevent a casual release of the tines while raking, as will be hereinafter explained.

To enable others skilled in the art to understand my invention, I will explain its construction and operation.

In the accompanying drawings—

A represents the revolving rake-head, into which the tines $a\ a$ are secured, in any suitable manner, so that they extend out equal distances on each side of the head, as shown in fig. 2, plate 1.

To two of the tines $a\ a$, at equal and proper distances, on opposite sides of the middle of the length of the head A, I apply sled-runners $b\ b$, for positively sustaining the rake upon the ground, at the required pitch or inclination for raking.

The points of the runners $b$ are applied to the points of the tines by means of metal shoes, or in any other suitable manner, which will allow the rear ends of these runners to be adjusted nearer to or further from the rake-head A, according to the raking-pitch required for the tines.

These runners are secured to the rake-head A by means of screws $d$, nuts $r$, and staples $c$, which latter are screwed fast to the runners, and receive through them the screws $d$, as shown in fig. 3. By this means the rear ends of the runners can be adjusted nearer to, or set further from the rake-head, thereby varying the pitch of the tines.

I am aware that it is not new with me to apply sled-runners to rake tines, but I believe that adjustable runners, as set forth, are new.

To the rake-head A the thills B B are applied, by means of straps, which will allow the said head to turn freely. The rear ends of these thills are curved upwardly, to give the proper draught, and also to allow sufficient space beneath them and the tines for gathering the proper load of hay.

D is the thill-bar, to which a single-tree is secured, and, C is a cross-bar, which is applied rigidly to the front ends of the thills, so that when the horse is hitched to the thills, this bar will cross in front of his breast, and be attached by a hold-back strap or chain to the hames.

I consider this cross-bar C a very important feature in the kind of rake herein described, as it serves to prevent the tines, while turning, from moving forward upon the horse, by affording the horse a purchase, by which he can keep back the machine while the tines are turning forward.

E is the rake-handle, which is forked, and connected centrally to the rake-head A, by straps, which will allow this head to turn freely.

Through the rear part of this handle E a slot is made, through which a cross-bar, F, is passed, and connected to the handle by a vertical pivot, $i$, so as to vibrate freely.

By means of rods $e\ e$, the bar F is connected with right-angular plates $f\ f$, which are recessed into the forks of the handle E, and which are loosely connected to two transverse slides $g\ g$, that meet in the centre of the space between the forks.

These slides are held together as indicated in figs. 1, 2, and 5, by a spring, $s$, which spring also serves another purpose, hereinafter to be described.

The slides serve to retain the rake in proper position for gathering a load, by arresting one of the tines $a$, between the forks of the handle E, and they also serve to release the rake by moving the bar F, so as to separate them.

Directly below the slides $g\ g$ are two transverse slides, $h\ h$, which are held together by means of springs P P, and which are constructed with outwardly-bevelled lugs $h'\ h'$.

The space between the slides $h\ h$, $g\ g$, and forks of the handle E, is adapted for receiving either one of the central tines $a$ of the rake, and by holding one of these tines, as shown in fig. 5, said slides hold all the tines, and the handle E is rigid.

The lower slides $h\ h$ prevent the rake from turning backward, and the bevelled portions $h'\ h'$, on these slides, allow a tooth, $a$, to separate them, and pass above or between them and the slides $g\ g$, during the act of bringing the rake in working-position, after the discharge of a load.

The spring $s$, which operates to hold together the slides $g\ g$, also holds the cross-bar F in the position represented in the drawings, and prevents the slides $g\ g$ from being casually separated while raking, but allows the separation of the slides when it is desired to discharge a load.

Having described my invention,

What I claim as new, and desire to secure by Letters Patent, is—

1. Adjustable runners $b$, applied to the tines of a turning-rake, substantially as described.

2. The laterally-movable catches $h\ h$, applied to handle E, constructed with bevelled lugs $h'\ h'$, and arranged beneath the laterally-movable catches $g\ g$, substantially as described.

3. The angle levers $f$, rods $e$, pivoted cross-handle F, catches $g\ g$, and spring $s$, applied to the rake-handle E, and arranged to operate substantially as described.

4. The laterally-movable catches $g\ g\ h\ h$, springs P $s$, angle-levers $f$, rods $c$, cross-handle F, and a slotted handle, E, arranged, constructed, and operating substantially as described.

WILLIAM H. LONG.

Witnesses:
 WM. McMETT,
 D. H. KELLOGG.